United States Patent [19]

Porter et al.

[11] Patent Number: 5,162,143

[45] Date of Patent: Nov. 10, 1992

[54] CORE DESIGN FOR USE WITH PRECISION COMPOSITE REFLECTORS

[75] Inventors: Christopher C. Porter, Pasadena; Paul J. Jacoy, Arcadia; Wesley P. Schmitigal, Alhambra, all of Calif.

[73] Assignee: The United States of America as represented by the Administrator, National Aeronautics and Space Administration, Washington, D.C.

[21] Appl. No.: 503,487

[22] Filed: Mar. 30, 1990

[51] Int. Cl.$^5$ .......................... B32B 3/28; G02B 5/08
[52] U.S. Cl. ..................................... 428/179; 428/105; 428/182; 428/184; 428/185; 428/186; 428/213; 52/795; 52/799; 52/800; 52/807; 359/883
[58] Field of Search ................ 350/631, 641; 428/182, 428/184, 185, 186, 174, 179, 133, 137, 245, 257, 292, 294, 225, 359, 360, 361, 362, 367, 368, 369, 375, 376, 408, 542.8, 105, 213; 52/795, 796, 799, 800, 807

[56] References Cited

U.S. PATENT DOCUMENTS

| | | | |
|---|---|---|---|
| 3,574,103 | 4/1971 | Latkin | 428/72 |
| 3,869,778 | 3/1975 | Yancey | 428/116 |
| 4,435,043 | 3/1984 | Mertens et al. | 350/288 |
| 4,466,700 | 8/1984 | Christiansen et al. | 350/310 |
| 4,550,986 | 11/1985 | Leach | 350/641 |
| 4,578,303 | 3/1986 | Kundinger et al. | 428/116 |
| 4,645,704 | 2/1987 | Hellwig | 428/576 |
| 4,678,292 | 7/1987 | Miyatani et al. | 350/609 |
| 4,772,111 | 9/1988 | Shimura et al. | 350/641 |
| 4,791,076 | 12/1988 | Leggett et al. | 501/95 |

Primary Examiner—Ellis P. Robinson
Assistant Examiner—Donald J. Loney
Attorney, Agent, or Firm—Thomas H. Jones; John R. Manning; Guy M. Miller

[57] ABSTRACT

A uniformly flexible core, and method for manufacturing the same, for use between the face plates of a sandwich structure. The core is made of a plurality of thin corrugated strips, the corrugations being defined by a plurality of peaks and valleys connected to one another by a plurality of diagonal risers. The corrugated strips are orthogonally criss-crossed to form the core. The core is particualrly suitable for use with high accuracy spherically curved sandwich structures because undesirable stresses in the curved face plates are minimized due to the uniform flexibility characteristics of the core in both the X and Y directions. The core is self-venting because of the open geometry of the corrugations. The core can be made from any suitable composite, metal, or polymer. Thermal expansion problems in sandwich structures may be minimized by making the core from the same composite materials that are selected in the manufacture of the curved face plates because of their low coefficients of thermal expansion. Where the strips are made of a composite material, the core may be constructed by first cutting an already cured corrugated sheet into a plurality of corrugated strips and then secondarily bonding the strips to one another or, alternatively, by lying a plurality of uncured strips orthogonally over one another in a suitable jig and then curing and bonding the entire plurality of strips to one another in a single operation.

9 Claims, 7 Drawing Sheets

CORE DESIGN FOR USE WITH PRECISION COMPOSITE REFLECTORS

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

This invention relates generally to cores used in flat or curved sandwich structures. More specifically, this invention relates to a new uniformly flexible core design that is capable of supporting a spherically curved implement, such as mirrors, antennas, etc., without causing complex stress related errors in the curvature of the implement. The flexible core supports the curved structure by uniformly conforming to the curved surface of the structure.

BACKGROUND ART

Many mirrors and other flat or curved implements are manufactured in sandwich form in order to provide an overall structure that is strong, rigid, and light. A typical sandwich structure is comprised of a support core surrounded by two face plates: a front plate and a back plate.

An example of an application for such sandwich structures are Large Deployable Reflectors (LDR). LDR reflectors are typically comprised of a grid of Precision Segmented Reflectors (PSR). The construction of the sandwich cores used in such an application is of paramount importance because the required accuracies (as low as 3 microns in some cases). Inaccuracies may be introduced by manufacturing tolerances where the core is rigid and must be machined to the curvature of the face plates, by uneven flexing characteristics where the core is flexible, and by expansion or contractions due to the harsh temperature environments such as LDR's may encounter.

One known core design has a hexagonal honeycomb configuration and is known as hex core (see FIG. 8). The problem with hex core is that it is rigid and cannot naturally flex in order to conform to the curvature of the face plates. Instead, both sides of the hex core must be machined to curvatures that mate precisely with the face plates. The machining process is time consuming and expensive. Moreover, inaccuracies are inevitable because of ordinary machining tolerances. When bonded together, any inaccuracy between the curvature of the machined hex core and the face plates lead to complex errors such as astigmatism.

Flexible cores that, unlike hex core, can be bent to a given curvature are known (see FIG. 9). For example, a flexible core is manufactured under the trade name FLEX-CORE by Hexcel Corporation. The problem with the known flexible cores is that their geometries are such that the cores can only bend uniformly in one direction. The known flexible cores are therefore unsuitable for supporting complex curved surfaces because the stresses created in the flexed core are transferred to the curved surface.

Thermal stability is also an important concern because curved sandwich structures are typically subject to wide temperature variations. For example, a lightweight mirror or antenna located in outer space may experience temperatures as low as 100 Kelvin and as high as 300 Kelvin. The geometry of the core and the overall design of the sandwich structure is very important under such extreme temperature variations.

First, the sandwich structure should be of uniform thickness so that thermal effects are uniform throughout. Although hex core can be machined on both sides to provide a curved core of uniform thickness, it can only be so machined at great effort and expense.

Second, the core, whether flat or curved, should be self-venting so that no air is trapped in the core between the face plates. Trapped air can lead to a debond between the facesheets and the core.

Third, where precise figure control is required, it is very important to minimize temperature-based stresses by ensuring that all three of the sandwich structure components have very low and equal coefficients of thermal expansion (CTE). The known flexible cores are often unsuitable for extreme temperature environments because they are only available in a limited number of materials. For example, FLEX-CORE is not available in graphite composite materials, materials that are commonly used to fabricate the faces plates because of their rigidity, lightness, and extremely low CTE characteristic.

STATEMENT OF THE INVENTION

It is an object of the present invention to provide a core that can be used in both flat and curved sandwich structures;

It is a further object of the present invention to provide a core that can be used in Precision Segmented Reflectors where high accuracies are required;

It is a further object of the present invention to provide a core that is uniformly flexible in both the X and Y directions (i.e. flexurally isotropic) so that the core can conform to face plates having complex curvatures (particularly spherical curvatures) without introducing stresses into the face plate;

It is a further object of the present invention to provide a core that can be made from a composite material that has a low coefficient of thermal expansion;

It is a further object of the present invention to provide a core that can be made from the same composite materials that are commonly used for the construction of the face plates in order to provide equal rates of expansion and contraction;

It is a further object of the present invention to provide a core that is self-venting;

It is a further object of the present invention to provide a core that can be made from a variety of materials such as metals or polymers;

The core of the present invention achieves the above objects by providing a flexible core structure comprising a plurality of thin corrugated strips having a plurality of corrugations, the corrugations of each strip being defined by a plurality of peaks and valleys that are connected by a plurality of diagonal risers, the strips being criss-crossed and connected to one another, peak-to-peak and valley-to-valley, so as to form a flexible core of any desired size.

BRIEF DESCRIPTION OF THE DRAWINGS

The just-summarized invention will now be described in detail in conjunction with the drawings of which:

FIG. 5 is a side elevational view of the core of FIG. 3;

DETAILED DESCRIPTION OF THE INVENTION

Figure 1:
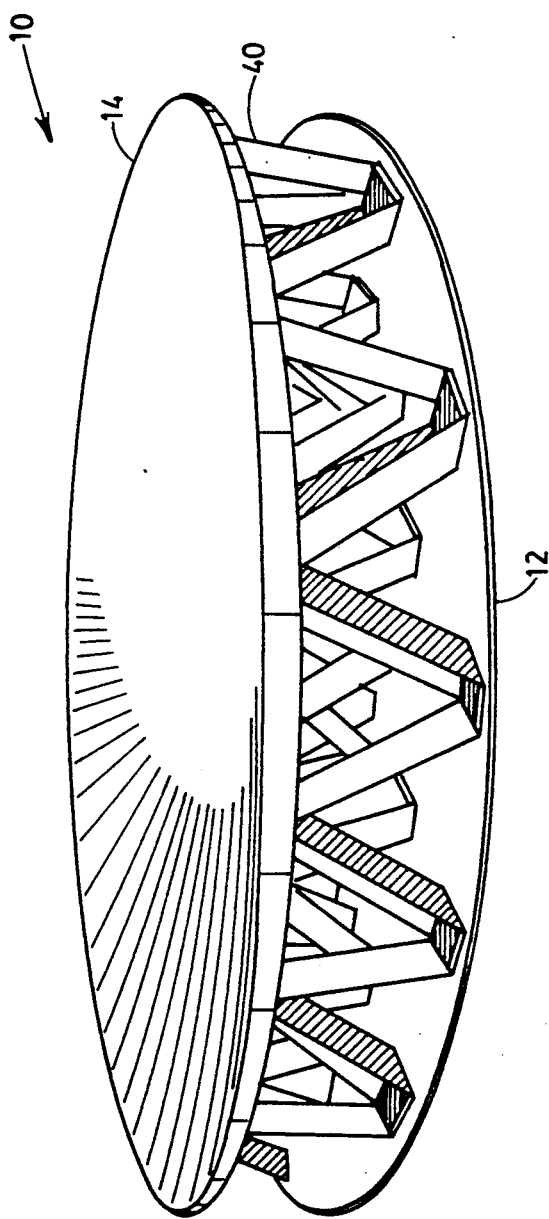
FIG. 1 is a perspective view of a curved sandwich-construction showing a core according to the present invention sandwiched between a curved back plate and a curved front plate.

FIG. 1 illustrates a spherically curved sandwich structure 10 in which a new core 40 according to the present invention is intended for use. The sandwich structure 10 is comprised of the new core 40 sandwiched between two face plates: a curved front plate 14 and a curved back plate 12. The end purpose of the sandwich structure 10 is to provide a lightweight, highly rigid panel.

Although not material to the present invention, the curved front plate 14 typically operates as a mirror or antenna and may be used singly or in groups of two or more.

While sandwich structures themselves are known, the current cores used in such structures leave considerable room for improvement. In particular, some of the known cores are rigid and must be individually machined to mate with the curvatures of the front and back plates 14, 12. Other known cores are flexible, but are only capable of being flexed in one direction (i.e., cylindrically) without distortion.

The present core 40 can beneficially flex uniformly in both the X and Y directions. A core with such uniform flexing characteristics is especially suitable for flexibly conforming to a spherically curved surface without introducing undue stresses into the surface.

Figure 2:
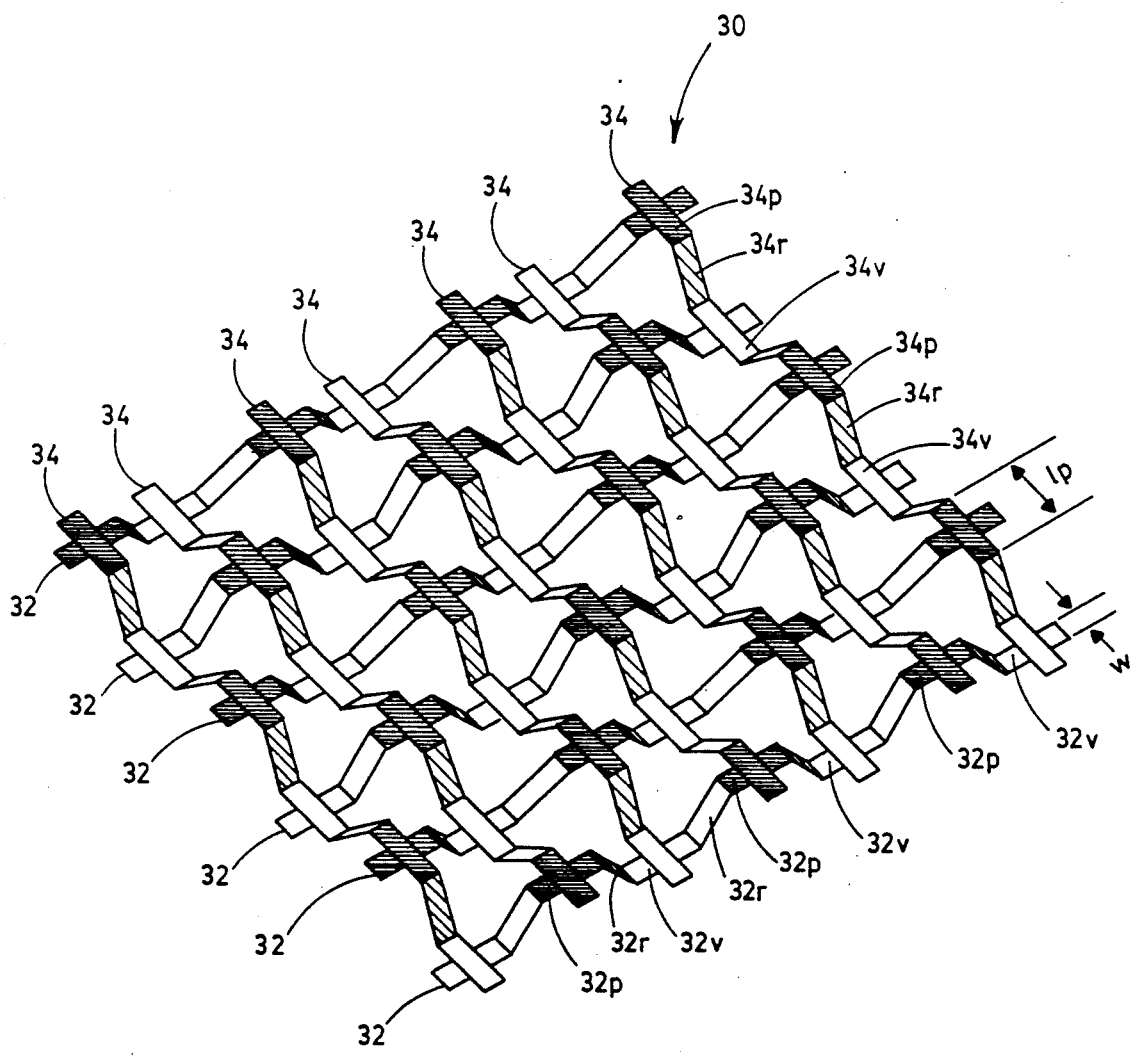
FIG. 2 is a perspective view of a first embodiment of a new core according to the present invention.

FIG. 2 is a perspective view of a first preferred embodiment of a core 30 according to the present invention. The core 30 is shown in its flat unflexed state, i.e., prior to being bonded between the curved front plate and the curved back plate.

The core 30 is comprised of a plurality of thin corrugated strips 32, 34. The strips 32, 34 can be of any suitable composite or unitary material, the chosen material being selected to provide the desired characteristic such as a specific coefficient of thermal expansion. An exemplary, but not exhaustive list of suitable composite materials includes: graphite fibers in an epoxy matrix; graphite fibers in a carbon matrix (known as carbon-carbon); and fiberglass in an epoxy matrix. Suitable unitary materials include all varieties of metals and polymers.

Each corrugated strip has a succession of peaks 32p and valleys 32v separated by diagonal risers 32r. One series of corrugated strips 32 is arranged substantially in parallel with one another in an alternating fashion so that each peak 32p (or valley 32v) of any particular strip is adjacent to a valley 32v (or peak 32p) of each strip 32 next to that particular strip. A second series of corrugated strips 34 are situated upon and substantially perpendicular to the first series of strips 32. The orthogonally oriented strips 32, 34 are bonded to each other at their respective peaks and valleys. In particular, the underside of each second series valley 34v is bonded to the upper side of a first series valley 32v. The same is true for each second series peak 34p and a corresponding first series peak 32p.

The corrugated strips 32, 34 may alternatively be overlapped with one another in a basket-weave fashion (not shown). Under this so-called basket-weave arrangement, the peaks and valleys of the first and second series corrugated strips 32, 34 would alternatively lie above and below one another.

Figure 3:
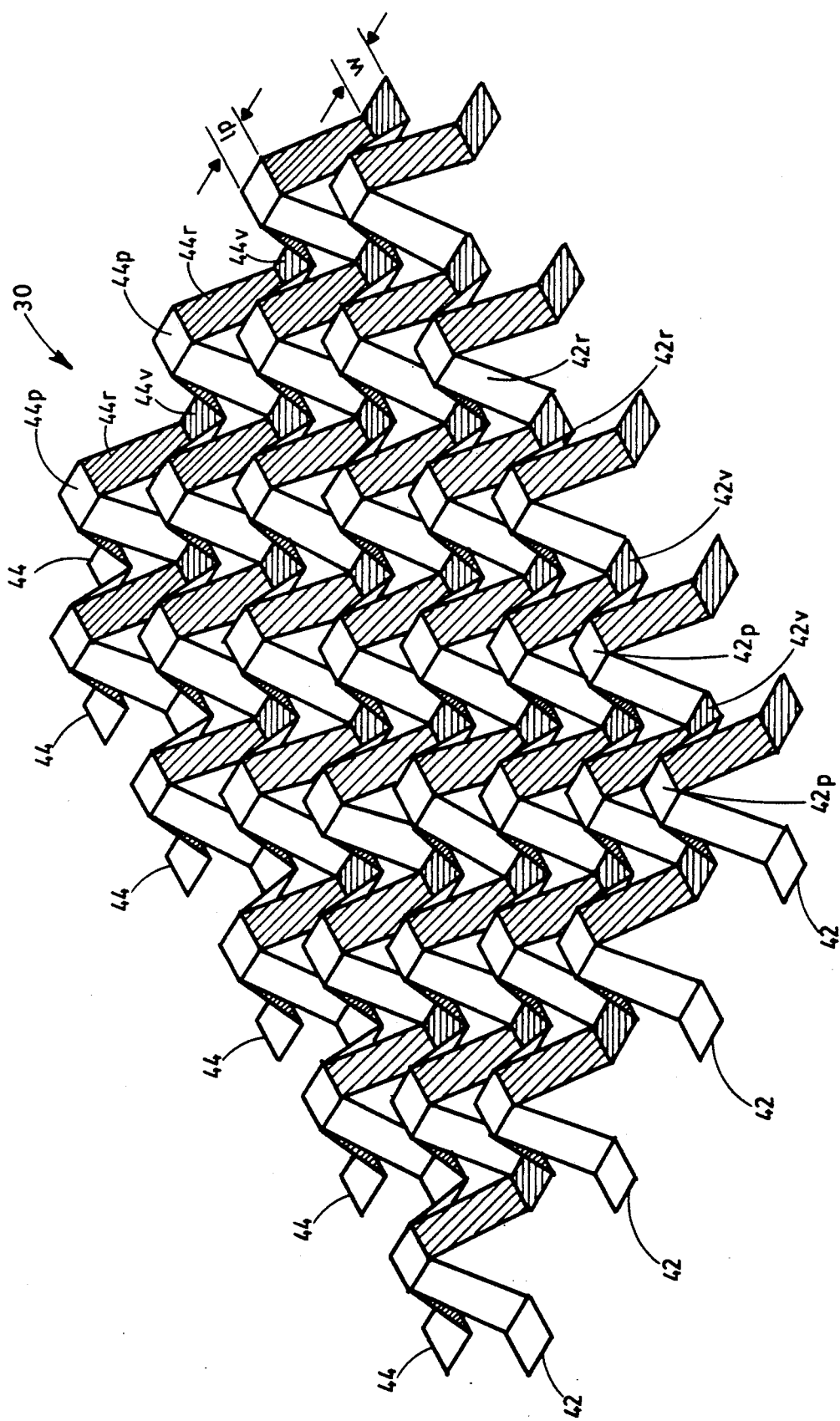
FIG. 3 is a perspective view of a second embodiment of a new-core according to the present invention.
Figure 4:
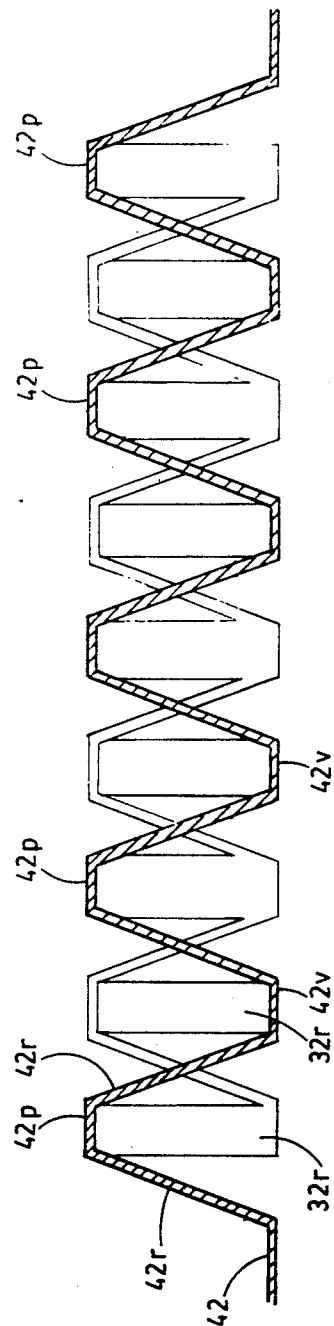
FIG. 4 is a side view showing the low density over geometry of the second preferred core of FIG. 3.

FIGS. 3, 4, and 5 illustrate a second preferred core 40. The difference between the first preferred core 30 and the second preferred core 40 is the relationship between the length $l_p$ of the peaks 32p, 34p, 42p, 44p and the width w of the corrugated strips 32, 34, 42, 44.

In the first preferred core 30, the length $l_p$ of the peaks 32p, 34p are greater than the width w of the corrugated strips 32, 34. In this fashion, the contact area between each of the crossed peaks 32p, 34p of the core 30 and the underside of the front plate 14 may be increased.

It is a well-known mathematical principal that a series of connected points more closely approximate a given curve as the number of points increase and the points grow closer together. The density of the contact areas (the crossed peaks that contact the face plates, shown in heavy cross hatching in FIG. 2) can be increased (1) by varying the angle at which the diagonal risers 32r, 42r bisect the planes containing the peaks and valleys and (2) by varying the ratio between the length $l_p$ of the peaks and the width W of the strips.

In the second preferred core 40, the length $l_p$ of the peaks 42p, 44p are equal to the width w of the corrugated strips so as to minimize the individual contact areas of crossed peaks 42p, 44p. Thus, the second preferred core 40 can more accurately drape over and support a given curved surface than can the first preferred core 30. Nonetheless, the first preferred core 30 may be desirable in situations where a lesser number of larger support areas is adequate or desirable.

In order to provide a sandwich structure having components with the same coefficient of thermal expansion (CTE), it is important that the support core 30, 40 be made from the same material that comprises the front plate 14 and the back plate 12. The front and back plates 14, 12 are often comprised of epoxy-impregnated carbon fiber because such material is light, strong, and rigid. The strips 32, 34, 42, 44 of the present invention may beneficially also be comprised of epoxy-impregnated fibers.

If a core having a different CTE than the front and back plates were used, the type of thermal errors that would occur would be complex, difficult to correct errors, such as astigmatic errors along the circumferential edge of the front plate 14. Because a support core 30, 40 according to the present invention can be made of the same material and have the same CTE as the front and back plates 14, 12, any errors that occur are simple errors that can be easily sensed and corrected with three or more piston-like actuators located between the back of the sandwich structure and the apparatus to which the structure is mounted.

FIG. 4 is a side view showing the low density open geometry of the second preferred core of FIG. 3. Viewed from the side, two of the second series strips 42 are visible; one in the foreground (shown with cross-hatched shading) and a second in the background (shown with no shading). The alternation of adjacent peaks and valleys is readily apparent from FIG. 4. In addition, the diagonal risers 32r of the first series of corrugated strips are shown.

Additional benefits are provided by the open geometry of the herein disclosed support cores 30, 40. As shown in FIGS. 1 and 4, the entire sandwich structure 10 is easily vented because of the open geometry inherent with a corrugated support core 30, 40 according to the present invention. The self-venting feature is important because no closed pockets are created when the core 40 is sandwiched between the face plates 14, 12. Because no closed pockets are created, no potential inaccuracies can arise due to a pressure differential between the interior and exterior of the sandwich structure. The self-venting feature also reduces the thermal inertia of the sandwich structure 10. Stresses related to temperature change are thereby reduced because heat can quickly and evenly dissipate throughout the sandwich structure. Finally, where all components of the sandwich structure are made of carbon-carbon, the self-venting characteristic of the core geometry allows the entire structure 10 to be easily redensified under a chemical vapor deposition (CVD) process.

The construction of a new core 30, 40 according to the present invention will now be described with reference to FIGS. 5 through 7.

Figure 6:
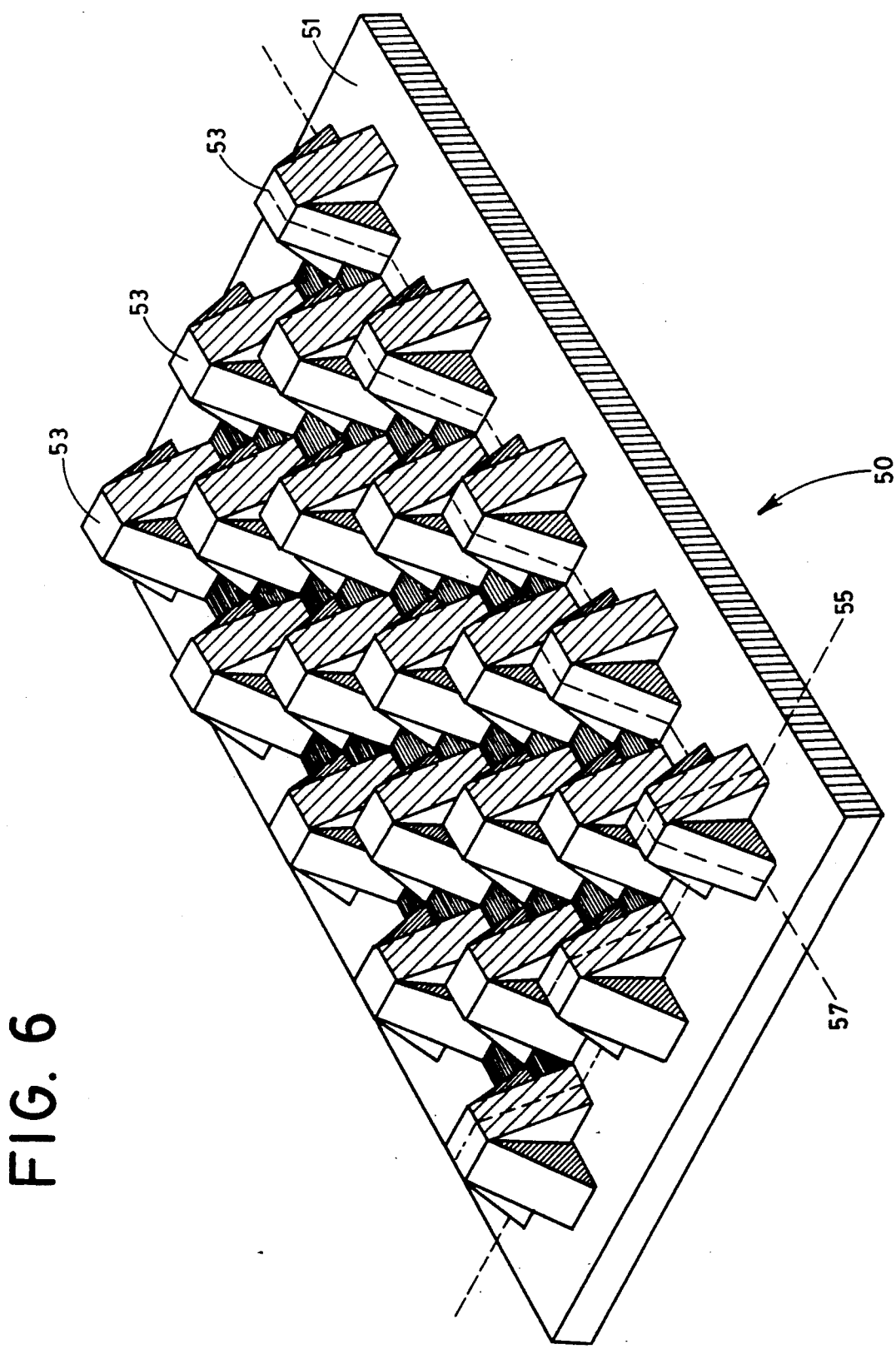
FIG. 6 is a perspective view of a first jig that may be used in the manufacture of a core, the jig being comprised of a baseplate and a plurality of jig component pairs arranged in a uniform grid pattern thereon.

FIG. 6 illustrates a first preferred forming jig 50 comprised of a base 51 and a plurality of forming protrusions 53 arranged in a substantially regular grid pattern thereon. Each orthogonally linear series of forming protrusions 53 defines a corrugated forming path (two of which are illustrated as dashed lines 55 and 57).

Figures 5A, 5B, 5C:
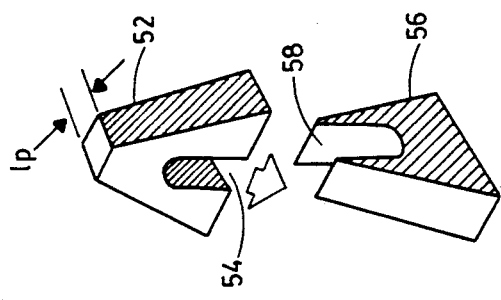
FIGS. 5(a) and 5(b) are side elevational views of two interlocking components used in the construction of a first jig suitable for manufacturing the cores of the present invention.
FIG. 5(c) is a perspective view showing how the jig components of FIGS. 5(a) and 5(b) interlock with one another.

The base 51 and forming protrusions 53 may be made of aluminum or any other suitable material. The preferred construction of an individual forming protrusion 53 is illustrated by FIGS. 5(a) to 5(c). Each forming protrusion 53 is comprised of an upper component 52 and a lower component 56. The upper component 52 has a downward opening notch 54 located at its bottom, the notch 54 being sized to engage with an upward opening notch 58 located at the top of the lower component 56.

FIG. 5(c) diagrammatically illustrates the upper component 52 being joined with an orthogonally oriented lower component 56 via notches 54 and 58. A plurality of the upper and lower components 52, 56 may be suitably bonded to one another to form a plurality of forming protrusions 53. The forming protrusions 53 are then suitably bonded to the upper surface of the base 51 to form the first preferred forming jig 50. The forming jig 50 could, of course, be machined or molded as a single piece.

The forming jig 50 shown in FIG. 6 has forming protrusion and forming paths 55, 57 that are dimensioned for producing a second preferred core 40 (where $l_p = w$). Of course, the space between the forming protrusions 53 and/or the dimensions of the protrusion components 52, 56 could be varied to produce a first preferred core 30 (where $l_p > w$).

A second preferred core 40 is constructed with the forming jig 50 as follows: A plurality of fibrous strips of width W are impregnated with any suitable epoxy. The strips are then individually laid along the forming paths 55, 57 of the jig 50 in an overlapping fashion (in either a criss-crossed or basket-weave fashion). Next, the strips are cured and bonded to one another at elevated temperature and pressure. After the epoxy-impregnated strips have been cured, the finished core 40 is lifted from the forming jig 50.

Figure 7:
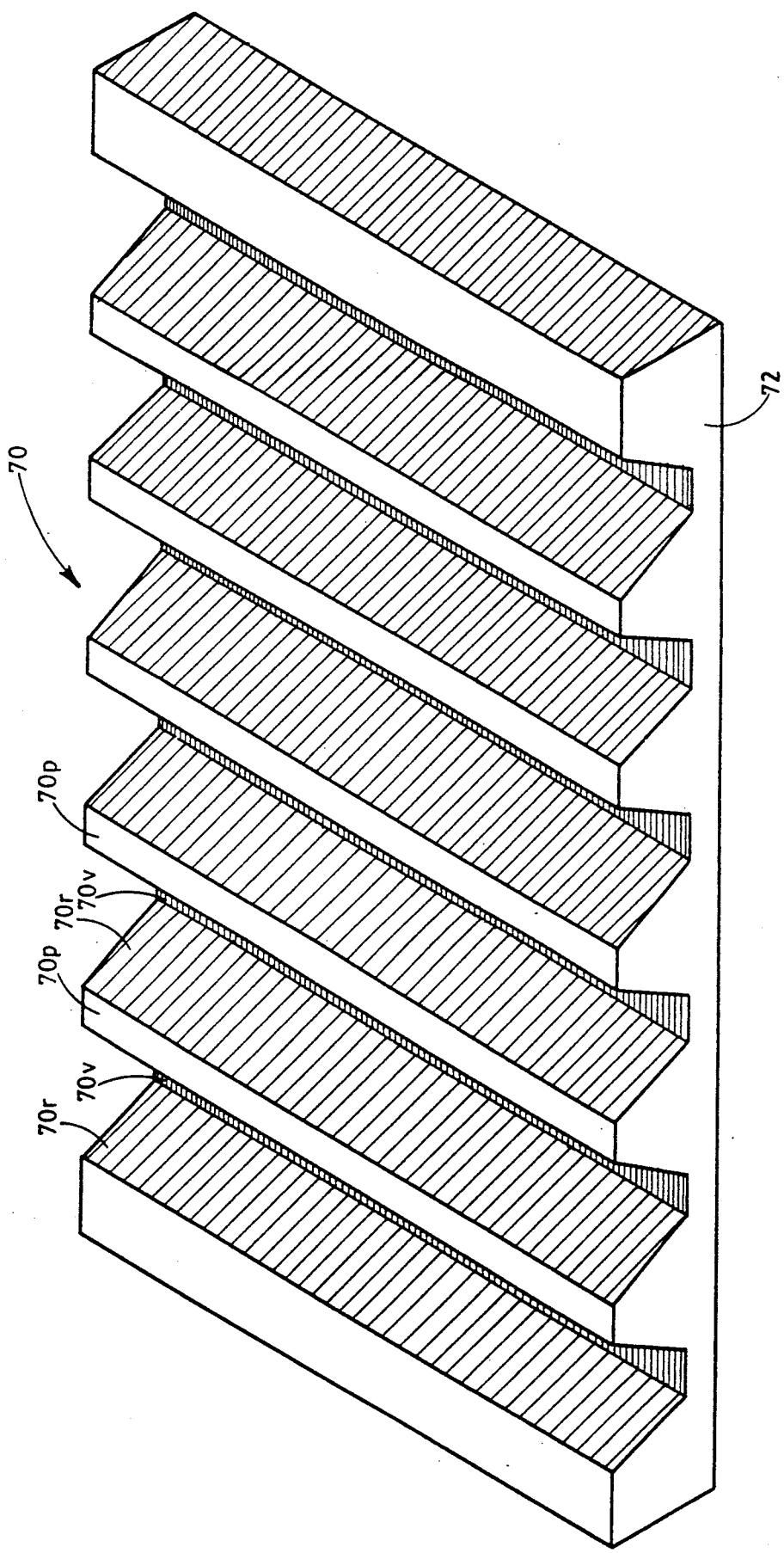
FIG. 7 is a perspective view of a second jig that may be used to manufacture corrugated sheets, which sheets can then be cut into corrugated strips and bonded to one another to form a core according to the present invention.
Figure 8:
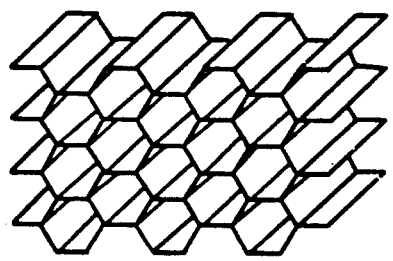
FIG. 8 is a perspective view of a prior art core known as hex core.
Figure 9:
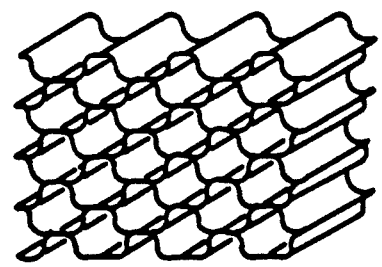
FIG. 9 is a perspective view of a prior art flexible core sold under the trade name FLEX CORE.

A second preferred forming jig 70 is illustrated in FIG. 7. The forming jig 70 is comprised of a base portion 72 and a series of parallel corrugated channels defined by a succession of peaks 70p and valleys 70v separated by diagonal risers 70r.

The forming jig 70 is used to make a corrugated sheet (not shown) by laying an epoxy-impregnated sheet of graphite fiber material onto the jig and into the corrugated channels. After the corrugated sheet has cured, it is removed from the forming jig 70 and cut, using any suitable method, into a plurality of corrugated strips. A support core according to the present invention is then constructed by secondarily bonding the corrugated strips to one another after placing the strips over one another in a criss-cross or basket-weave fashion.

As will be apparent to those skilled in the art, various modifications and adaptations of the preferred embodiment may be made without departing from the scope and spirit of the invention. It is therefore to be understood that, within the scope of the appended claims, the invention may be practiced other than as specifically described herein.

We claim:

1. A flexurally isotropic core structure comprising:
   a plurality of thin corrugated strips having a plurality of corrugations, the corrugations of each strip being defined by a plurality of peaks and valleys that are connected by a plurality of diagonal risers;
   said strips being criss-crossed and connected to one another, peak-to-peak and valley-to-valley, so as to form a flexurally isotropic core of any desired size.

2. The flexible core structure of claim 1 wherein each strip is of equal width W.

3. The flexible core structure of claim 2 wherein the dimension of each peak and valley, along the lengthwise direction of each strip, is equal to the width W of each strip.

4. The flexible core structure of claim 2 wherein the dimension of each peak and valley, along the lengthwise direction of each strip, is greater than the width W of each strip.

5. The flexible core structure of claim 1 wherein the thin corrugated strips are made of a composite material.

6. The flexible core structure of claim 5 wherein the thin corrugated strips are comprised of graphite fibers in an epoxy matrix.

7. The flexible core structure of claim 5 wherein the thin corrugated strips are comprised of graphite fibers in a graphite matrix.

8. The flexible core structure of claim 1 wherein the thin corrugated strips are metallic.

9. The flexible core structure of claim 1 wherein the thin corrugated strips are made of a polymer.

* * * * *